United States Patent
Rizzo et al.

(10) Patent No.: US 9,950,569 B2
(45) Date of Patent: Apr. 24, 2018

(54) FARM TYRE WITH PROTECTIVE CAPS

(71) Applicant: BRIDGESTONE CORPORATION, Tokyo (JP)

(72) Inventors: Paolo Francesco Rizzo, Rome (IT); Fabrizio Peretti, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 259 days.

(21) Appl. No.: 14/443,569

(22) PCT Filed: Nov. 21, 2013

(86) PCT No.: PCT/IB2013/060315
§ 371 (c)(1),
(2) Date: May 18, 2015

(87) PCT Pub. No.: WO2014/080362
PCT Pub. Date: May 30, 2014

(65) Prior Publication Data
US 2015/0314649 A1     Nov. 5, 2015

(30) Foreign Application Priority Data
Nov. 21, 2012 (IT) .............. RM2012A0584

(51) Int. Cl.
*B60C 9/18* (2006.01)
*B60C 11/00* (2006.01)
(Continued)

(52) U.S. Cl.
CPC .............. *B60C 9/18* (2013.01); *B60C 9/0007* (2013.01); *B60C 9/02* (2013.01); *B60C 9/185* (2013.01);
(Continued)

(58) Field of Classification Search
CPC ... B60C 11/00; B60C 11/0311; B60C 9/0007; B60C 9/02; B60C 9/18; B60C 9/185;
(Continued)

(56) References Cited

U.S. PATENT DOCUMENTS 5,830,295 A * 11/1998 Hobbs .................. B60C 9/2009
                                                                        152/526
6,536,496 B1    3/2003 Bondu
(Continued)

FOREIGN PATENT DOCUMENTS

DE    10 2005 049 184 A1    4/2007
JP        7-009811 A           1/1995
(Continued)

OTHER PUBLICATIONS

International Search Report for PCT/IB2013/060315 dated Jun. 4, 2014.
Written Opinion for PCT/IB2013/060315 dated Jun. 4, 2014.

*Primary Examiner* — Michael H. Wilson
*Assistant Examiner* — Sedef E Ayalp
(74) *Attorney, Agent, or Firm* — Sughrue Mion, PLLC

(57) ABSTRACT

A farm tire including a carcass; a tread supported by the carcass and having a number of lugs; a tread belt interposed between the carcass and the tread, and having an outer tread ply and an inner tread ply, which are superimposed and each have a number of metal cords embedded in a rubber strip; the tire. The farm tire also includes two tread ply wedges, each interposed between the lateral ends of the two tread plies; and protective caps covering the two ends of each of the tread plies, each made of rubber and folded into a 'U' about the respective ply end; wherein the protective cap of the inner tread ply is partly defined by an outer appendix of the corresponding tread ply wedge.

24 Claims, 5 Drawing Sheets

(51) Int. Cl.
*B60C 9/02* (2006.01)
*B60C 9/00* (2006.01)
*B60C 11/03* (2006.01)
*B60C 9/28* (2006.01)

(52) U.S. Cl.
CPC .............. *B60C 9/28* (2013.01); *B60C 11/00* (2013.01); *B60C 11/0311* (2013.01); *B60C 2009/1842* (2013.01); *B60C 2009/1864* (2013.01); *B60C 2011/0313* (2013.01); *B60C 2200/08* (2013.01)

(58) Field of Classification Search
CPC . B60C 9/28; B60C 9/1835; B60C 2009/1842; B60C 2009/1864; B60C 2009/2006; B60C 2009/20; B60C 2009/1871; B60C 2011/0313; B60C 2200/08; B60C 5/00; B60C 2001/0075; B60C 11/005
USPC ........................................ 152/209.12, 209.1
See application file for complete search history.

(56) References Cited

U.S. PATENT DOCUMENTS

| | | | |
|---|---|---|---|
| 7,243,695 B2 | 7/2007 | Gervais et al. | |
| 2004/0118497 A1* | 6/2004 | Bonko | B60C 11/0311 152/209.12 |
| 2007/0169870 A1* | 7/2007 | Manno | B60C 9/2006 152/531 |
| 2007/0221309 A1* | 9/2007 | Cohen | B60C 9/20 152/532 |
| 2012/0060995 A1* | 3/2012 | Maruoka | B60C 9/28 152/527 |
| 2013/0264004 A1 | 10/2013 | Yanai et al. | |

FOREIGN PATENT DOCUMENTS

| | | |
|---|---|---|
| JP | 2000-177316 A | 6/2000 |
| WO | 2012/057357 A1 | 5/2012 |

* cited by examiner

FARM TYRE WITH PROTECTIVE CAPS

CROSS REFERENCE TO RELATED APPLICATIONS

This application is a National Stage of International Application No. PCT/IB2013/060315 filed Nov. 21, 2013, claiming priority based on Italian Patent Application No. RM2012A000584 filed Nov. 21, 2012, the contents of all of which are incorporated herein by reference in their entirety.

TECHNICAL FIELD

The present invention relates to a farm tyre.

BACKGROUND ART

A farm tyre normally comprises a toroidal carcass comprising a number of superimposed body plies and turned up at the ends about two annular beads. The carcass supports an annular tread; and between the carcass and the tread is interposed a tread belt, which comprises two superimposed tread plies comprising respective metal (typically steel) cords. Two tread ply wedges are interposed between the lateral ends of the two tread plies, to act as a cushion separating the tread plies. More specifically, at the join between the two tread plies, the opposite orientation of the cords of the two tread plies creates a critical point at which, when the tyre is stressed, deformation of the tread may result in slippage between the two tread plies. By absorbing and compensating for this slippage between the two tread plies, the tread ply wedges prevent it from resulting in local detachment (i.e. separation, failure) of the tread plies.

Patent Application DE102005049184A1, which constitutes the most recent state of the art, describes a tyre comprising: a carcass; a tread supported by the carcass; a tread belt interposed between the carcass and the tread and comprising an outer tread ply superimposed on an inner tread ply; and two tread ply wedges, each interposed between and locally diverging the lateral ends of the two tread plies. In this tyre, the two ends of each tread ply are covered with respective protective caps, each made of rubber and folded into a 'U' about the respective end.

DESCRIPTION OF THE INVENTION

It is an object of the present invention to provide a farm tyre with a long working life, and which in particular is cheap and easy to produce.

According to the present invention, there is provided a farm tyre as claimed in the accompanying Claims.

BRIEF DESCRIPTION OF THE DRAWINGS

A non-limiting embodiment of the present invention will be described by way of example with reference to the attached drawings, in which.

PREFERRED EMBODIMENTS OF THE INVENTION

Figure 2:
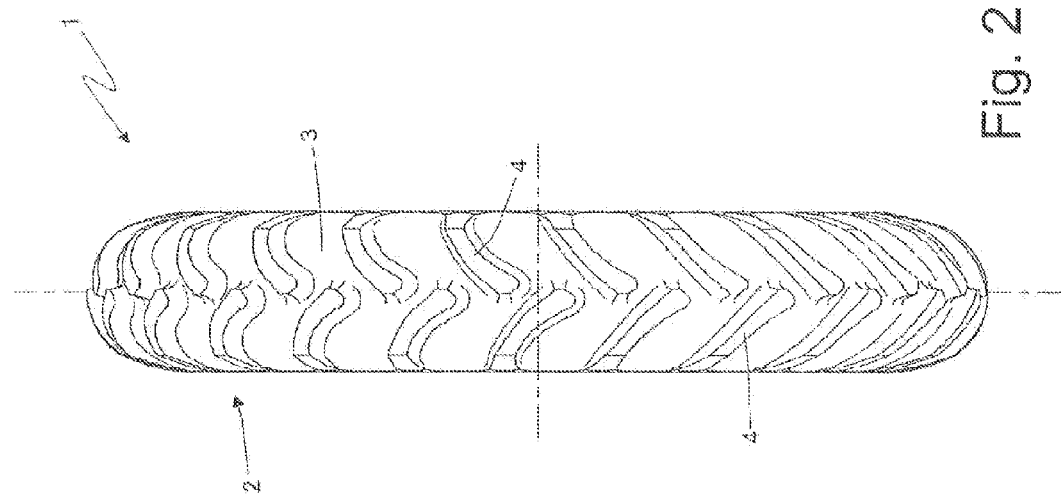
FIG. 2 shows a front view of the FIG. 1 farm tyre.
Figure 1:
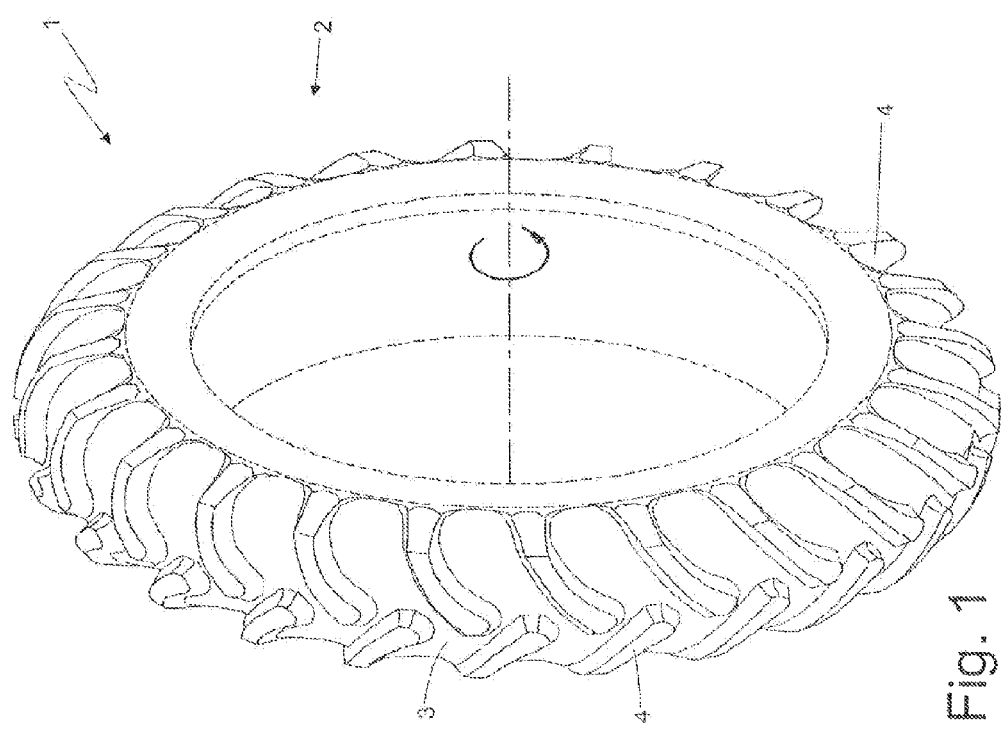
FIG. 1 shows a view in perspective of a farm tyre in accordance with the present invention.

Number 1 in FIGS. 1 and 2 indicates as a whole a farm tyre.

Figure 3:
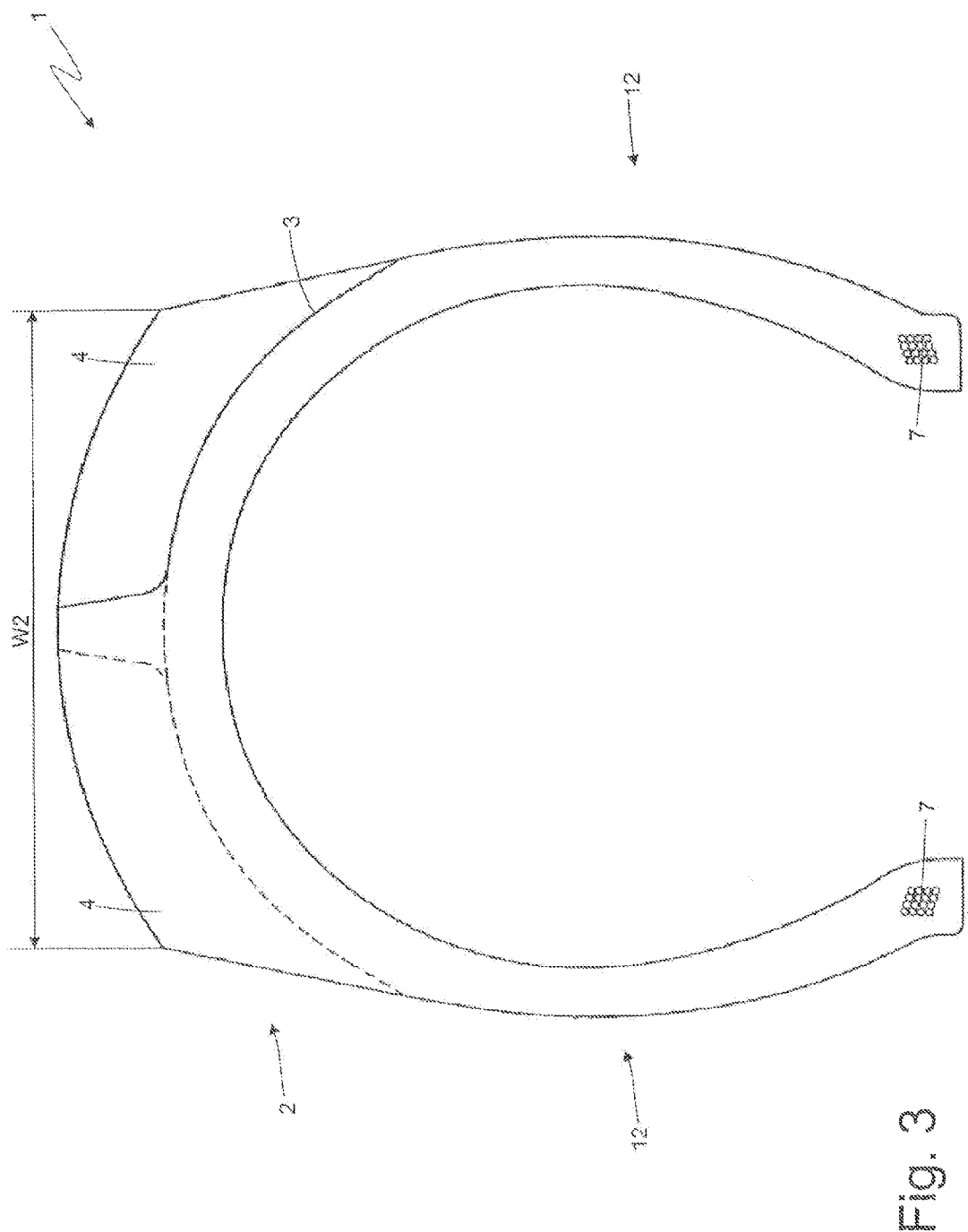
FIG. 3 shows a cross section, with parts removed for clarity, of part of the FIG. 1 farm tyre.

Tyre 1 comprises a toroidal tread 2, which extends about a central axis of rotation and comprises a tread base 3 of substantially constant thickness, and a number of lugs 4 projecting (i.e. extending radially outwards) from tread base 3 and spaced about the axis of rotation. Each lug 4 curves from a centre portion of tyre 1 to a corresponding shoulder of tyre 1, has a truncated-cone-shaped cross section (tapering away from tread base 3), and has a front wall and rear wall with respect to a predetermined rolling direction of tyre 1. Because of lugs 4, the so-called 'void ratio' (i.e. the ratio between the footprint area not contacting the ground, and the total footprint area) is over 50% and typically 60-70%. As shown in FIG. 3, the width W2 of tread 2 is traditionally measured between the ends of the lateral arcs of tread 2.

Figure 4:
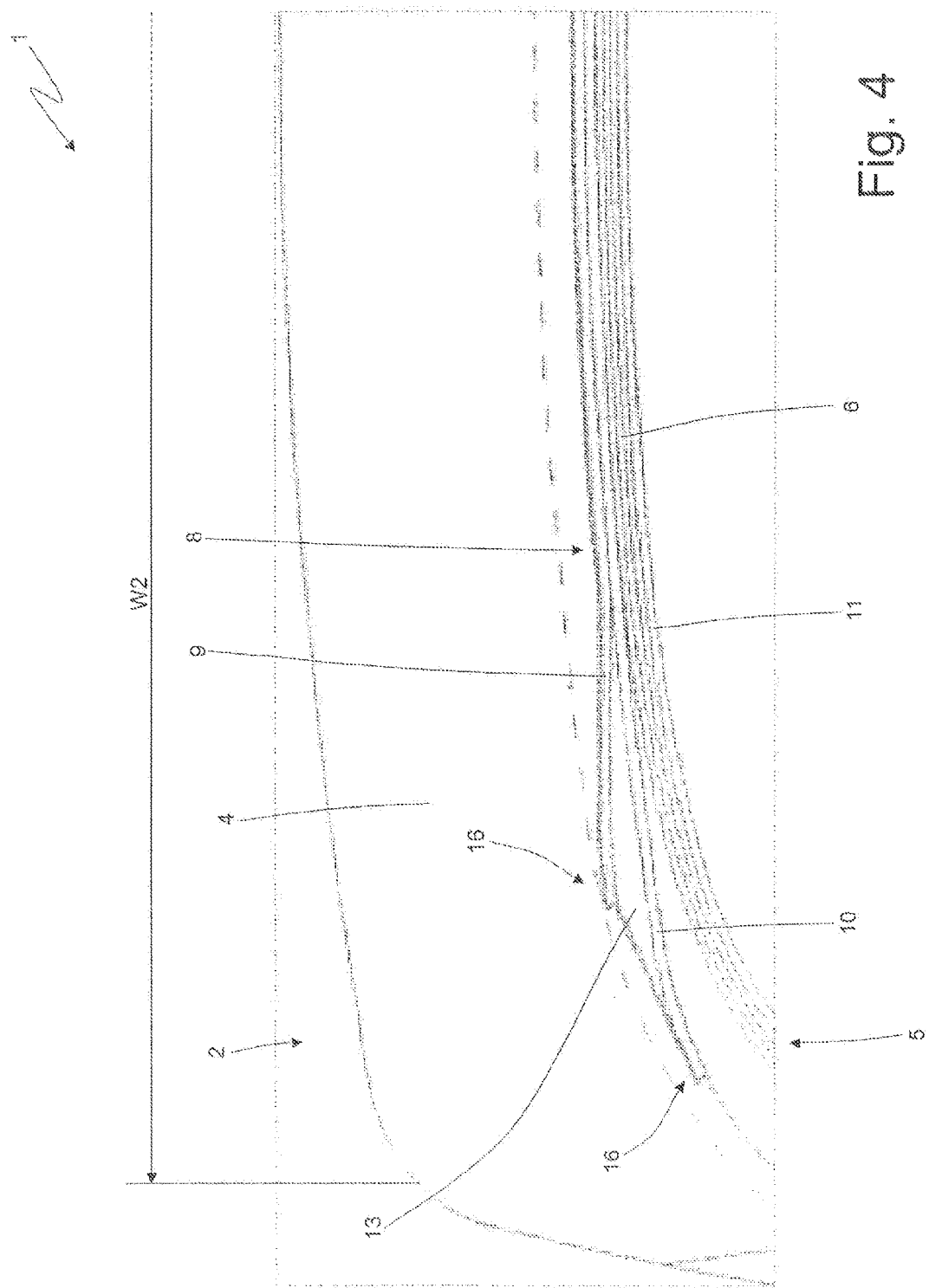
FIG. 4 shows a cross section, with parts removed for clarity, of part of the carcass, tread belt, and tread of the FIG. 1 farm tyre.

As shown in FIG. 4, tyre 1 comprises a toroidal carcass 5 defined by three superimposed body plies 6 and turned up at the ends about two annular beads 7 (shown in FIG. 3). In a preferred embodiment, each body ply comprises a number of textile (i.e. non-metal) cords embedded in a rubber strip. Carcass 5 supports tread 2; and between carcass 5 and tread 2 is interposed a tread belt 8 comprising two (and only two) superimposed tread plies 9 and 10.

Carcass 5 is lined with an innerliner 11, which is impermeable to air and serves to retain air inside, and maintain the inflation pressure of, tyre 1. Carcass 5 supports two sidewalls 12 (FIG. 3) located on the outside of carcass 5, between tread 2 and beads 7.

Two tread ply wedges (TPWs) are interposed between the lateral ends of tread plies 9 and 10, to act as a cushion and separate tread plies 9 and 10. In other words, each tread ply wedge 13 is interposed between, to locally diverge, the lateral ends of tread plies 9 and 10. The purpose of diverging the lateral ends of tread plies 9 and 10 is to form a cushion and separate tread plies 9 and 10.

Figure 5:
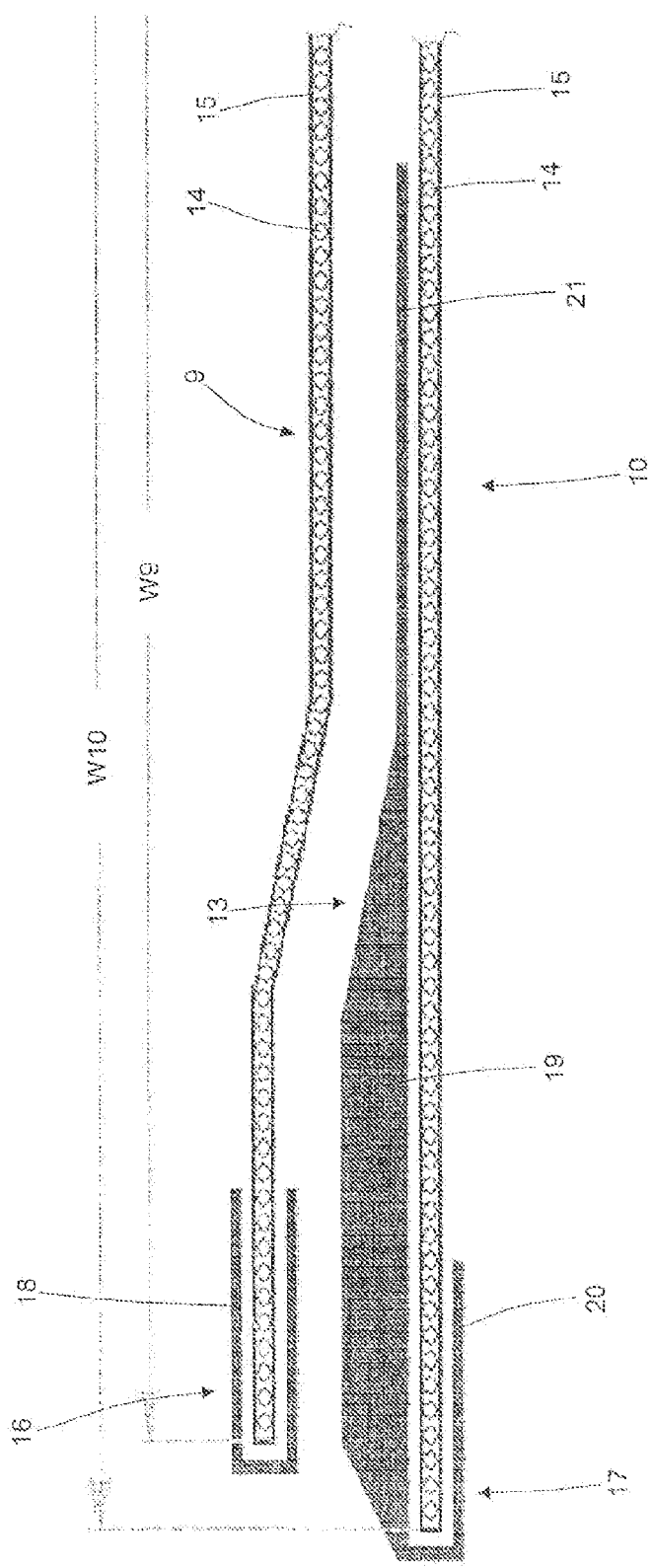
FIG. 5 shows a schematic cross section of the ends of two tread plies forming the tread belt of the FIG. 1 farm tyre.

As shown in FIG. 5, each tread ply 9, 10 comprises a number of metal (typically steel) cords 14, which are embedded in a rubber strip 15, are arranged side by side with a given spacing, and form a given (typically 75°) slope angle with the equatorial plane of tyre 1.

In a preferred embodiment, the width W9 (FIG. 5) of the outer tread ply 9 ranges between 60% and 80%, and is preferably 75%, of the width W2 (FIG. 3) of tread 2. In a preferred embodiment, the width W10 (FIG. 5) of the inner tread ply 10 ranges between 80% and 95%, and is preferably 91%, of the width W2 (FIG. 3) of tread 2. It is important to note that the respective widths W9 and W10 of tread plies 9 and 10 are greater than in a similar conventional tyre. In other words, tread plies 9 and 10 of tyre 1 are wider than in a similar conventional tyre. This increase in the width of tread plies 9 and 10 increases rigidity at the shoulders of tyre 1; reduces stress on innerliner 11, caused by lugs 4 on tread 2 penetrating carcass 5; and so, in the final analysis, increases the working life of tyre 1.

As shown in FIG. 5, the two ends of each tread ply 9, 10 are covered with respective protective caps 16, 17, each made of rubber and folded into a 'U' about the respective end. In a preferred embodiment, each protective cap 16, 17 is made of the same type of rubber as rubber strips 15 of tread plies 9 and 10, i.e. a rubber (normally containing a certain amount of cobalt) allowing good mechanical adhesion to the metal (typically steel) from which cords 14 of tread plies 9 and 10 are made. In a preferred embodiment, each protective cap 16, 17 covers an at least 10 mm wide portion of the corresponding end, and is over 0.4 mm thick.

Each protective cap 16 of outer tread ply 9 is independent of the corresponding tread ply wedge 13. In other words, each protective cap 16 of outer tread ply 9 is initially completely separate from the corresponding tread ply wedge 13, and is folded about the end of outer tread ply 9 independently of application of the corresponding tread ply wedge 13. More specifically, each protective cap 16 of outer tread ply 9 is defined by an annular strip 18, which is folded into a 'U' about the corresponding end of tread ply 9 before tread ply 9 is wound about carcass 5.

As shown in FIG. 5, each tread ply wedge 13 comprises a thick central body 19 interposed between tread plies 9 and 10; an outer appendix 20, which is thinner than central body 19 and folded about one end of inner tread ply 10 to form part of corresponding protective cap 17; and an inner appendix 21, which is located on the opposite side to outer appendix 20, is thinner than central body 19, and is interposed between tread plies 9 and 10. Each protective cap 17 of inner tread ply 10 is thus partly defined by outer appendix 20 of the corresponding tread ply wedge 13.

The central body 19 of each tread ply wedge 13 preferably has a scalene trapezium-shaped cross section (i.e. in which the trapezium has two different oblique sides). This shape has the big advantage of following the natural profile of tread plies 9 and 10, so stress is distributed more evenly, and there is less risk of air becoming trapped inside tyre 1 as it is built.

Figure 6:
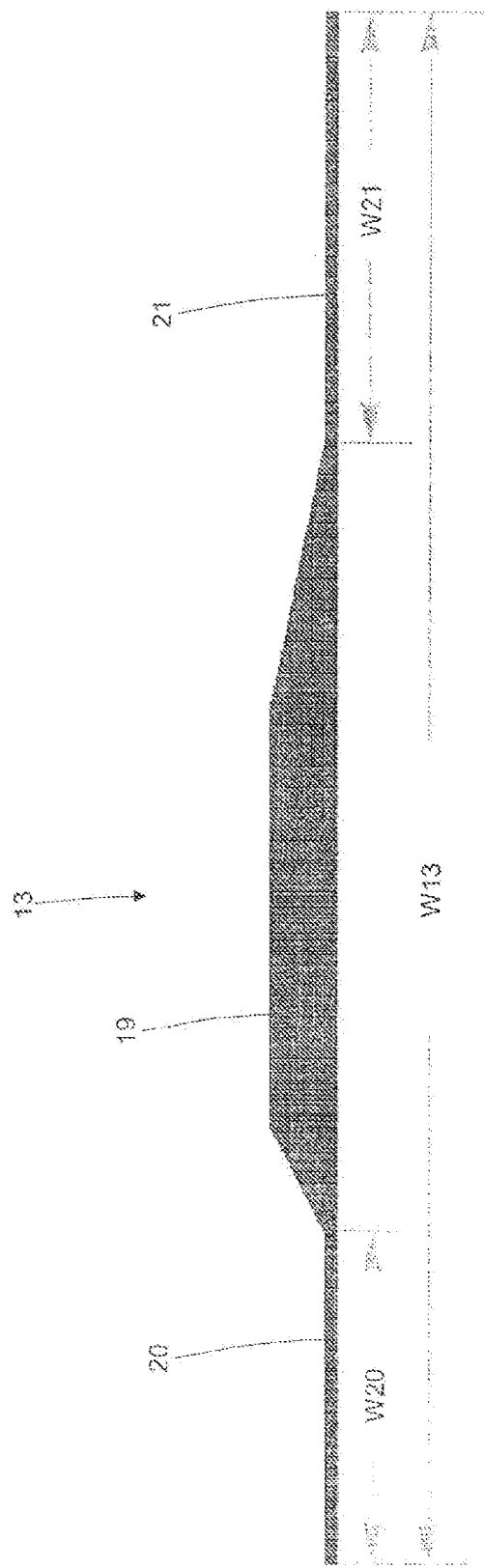
FIG. 6 shows a schematic cross section of a tread ply insert of the FIG. 1 farm tyre before being inserted inside the tyre.

In a preferred embodiment, central body 19 of each tread ply wedge 13 has a maximum thickness of over 1.5 mm, and outer appendix 20 and inner appendix 21 have the same constant thickness of over 0.4 mm (i.e. outer appendix 20 of each tread ply wedge 13 is the same thickness as inner appendix 21). In a preferred embodiment, the width W20 (FIG. 6) of outer appendix 20 of each tread ply wedge 13 is over 10 mm and is preferably 15 mm. In a preferred embodiment, the width W21 (FIG. 6) of inner appendix 21 of each tread ply wedge 13 is over 10 mm and is preferably 20 mm.

Farm tyre 1 described above has numerous advantages.

First and foremost, farm tyre 1 described above has a long working life because of protective caps 16 and 17. More specifically, being exposed at the ends of tread plies 9 and 10, the ends of (metal) cords 14 may eventually cause mechanical damage (i.e. by 'digging' into the surrounding rubber). This localized damage may gradually impair the performance of tyre 1, even to the extent of reducing its working life. With protective caps 16 and 17, on the other hand, the parts of tyre 1 close to the ends of tread plies 9 and 10 are protected mechanically from damage by the ends of (metal) cords 14.

Furthermore, farm tyre 1 described above is cheap and easy to produce, by protective caps 16 and 17 involving no major increase in material cost, and no major complication of the manufacturing process. In this connection, it is important to note how protective caps 17 are formed extremely easily from tread ply wedges 13.

It is important to note how protective caps 16 and 17 are particularly useful in combination with tread plies 9 and 10 of respective widths W9 and W10 greater than those of a similar conventional tyre. In other words, increasing widths W9 and W10 of tread plies 9 and 10 shifts the ends of tread plies 9 and 10 outwards, and so shifts the ends of (metal) cords 14 into more 'fragile' areas, thus making the protective function of protective caps 16 and 17 even more essential. In other words, a synergic effect exists between the increase in widths W9 and W10 of tread plies 9 and 10, and the presence of protective caps 16 and 17.

The invention claimed is:

1. A farm tyre comprising:
   a carcass comprising at least two superimposed body plies;
   a tread supported by the carcass and having a number of lugs projecting from a tread base;
   a tread belt interposed between the carcass and the tread, and comprising an outer tread ply and an inner tread ply, which are superimposed, present respective lateral ends and each comprising a number of metal cords embedded in a rubber strip; and
   two tread ply wedges, each interposed between and locally diverging the respective lateral ends of the outer tread ply and the inner tread ply;
   wherein each lateral end of each tread ply is covered with a corresponding protective cap, each made of rubber and folded into a 'U' about the end;
   wherein each tread ply wedge comprises an outer appendix that is folded about the corresponding end of the inner tread ply to form the protective cap of the inner tread ply so that each protective cap is integrated in the corresponding tread ply wedge;
   wherein each tread ply wedge comprises: a thick central body interposed between the two tread plies, the outer appendix is thinner than the central body and is folded about the corresponding end of the inner tread ply to form the corresponding protective cap; and an inner appendix, which is located on an opposite side of the central body with respect to the outer appendix and is thinner than the central body and is interposed between the two tread plies;
   wherein the outer appendix of each tread ply wedge has a same thickness as the inner appendix; and
   wherein a width of the outer appendix of each tread ply wedge is over 10 mm.

2. A farm tyre as claimed in claim 1, wherein each protective cap is made of the same type of rubber as the rubber strips of the tread plies.

3. A farm tyre as claimed in claim 1, wherein each protective cap of the outer tread ply is independent of the corresponding tread ply wedge.

4. A farm tyre as claimed in claim 1, wherein each protective cap covers an at least 10 mm wide portion of the corresponding end.

5. A farm tyre as claimed in claim 1, wherein each protective cap is over 0.4 mm thick.

6. A farm tyre as claimed in claim 1, wherein the central body of each tread ply wedge has a scalene trapezium-shaped cross section.

7. A farm tyre as claimed in claim 1, wherein the central body of each tread ply wedge has a maximum thickness of over 1.5 mm.

8. A farm tyre as claimed in claim 1, wherein the outer appendix of each tread ply wedge is over 0.4 mm thick.

9. A farm tyre as claimed in claim 1, wherein a width of the outer tread ply ranges between 60% and 80% of the width of the tread.

10. A farm tyre as claimed in claim 1, wherein a width of the inner tread ply ranges between 80% and 95% of the width of the tread.

11. A farm tyre comprising:
a carcass comprising at least two superimposed body plies;
a tread supported by the carcass and having a number of lugs projecting from a tread base;
a tread belt interposed between the carcass and the tread, and comprising an outer tread ply and an inner tread ply, which are superimposed, present respective lateral ends and each comprising a number of metal cords embedded in a rubber strip; and
two tread ply wedges, each interposed between and locally diverging the respective lateral ends of the outer and inner tread plies;
wherein each end of each tread ply is covered with a corresponding protective cap made of rubber and folded into a 'U' about the respective end;
wherein each tread ply wedge comprises an outer appendix which is folded about one end of the inner tread ply to form the protective cap so that the protective cap is integrated in the tread ply wedge; and
wherein a width of the outer appendix of each tread ply wedge is over 10 mm.

12. The farm tyre as claimed in claim 11, wherein the width of the outer appendix of each tread ply wedge is 15 mm.

13. The farm tyre as claimed in claim 11, wherein the outer appendix of each tread ply wedge is over 0.4 mm thick.

14. The farm tyre as claimed in claim 11, wherein a width of the outer tread ply ranges between 60% and 80% of a width of the tread.

15. The farm tyre as claimed in claim 11, wherein a width of the inner tread ply ranges between 80% and 95% of a width of the tread.

16. The farm tyre as claimed in claim 11, wherein each protective cap is made of a same type of rubber as the rubber strips of the tread plies.

17. The farm tyre as claimed in claim 11, wherein a central body of each tread ply wedge has a scalene trapezium-shaped cross section and has a maximum thickness of over 1.5 mm.

18. The farm tyre as claimed in claim 11, wherein each protective cap covers an at least 10 mm wide portion of the corresponding tread ply end.

19. A farm tyre comprising:
a carcass comprising at least two superimposed body plies;
a tread supported by the carcass and having a number of lugs projecting from a tread base;
a tread belt interposed between the carcass and the tread, and comprising an outer tread ply and an inner tread ply, which are superimposed, present respective lateral ends and each comprise a number of metal cords embedded in a rubber strip; and
two tread ply wedges, each interposed between and locally diverging the respective lateral ends of the outer and inner tread plies;
wherein each end of each tread ply is covered with a corresponding protective cap made of rubber and folded into a 'U' about the respective end;
wherein each tread ply wedge comprises an outer appendix which is folded about one end of the inner tread ply to form the protective cap so that the protective cap is integrated in the corresponding tread ply wedge; and
wherein the outer appendix of each tread ply wedge is over 0.4 mm thick.

20. The farm tyre as claimed in claim 19, wherein a width of the outer tread ply ranges between 60% and 80% of the width of the tread.

21. The farm tyre as claimed in claim 19, wherein a width of the inner tread ply ranges between 80% and 95% of a width of the tread.

22. The farm tyre as claimed in claim 19, wherein each protective cap is made of a same type of rubber as the rubber strips of the tread plies.

23. The farm tyre as claimed in claim 19, wherein a central body of each tread ply wedge has a scalene trapezium-shaped cross section and has a maximum thickness of over 1.5 mm.

24. The farm tyre as claimed in claim 19, wherein each protective cap covers an at least 10 mm wide portion of the corresponding end.

* * * * *